United States Patent
Yagi (10) Patent No.: US 7,252,189 B2
(45) Date of Patent: Aug. 7, 2007

(54) METHOD FOR ALIGNING LAMINATED ELECTRONIC PARTS IN DESIRED ORIENTATION AND ALIGNMENT DEVICE THEREFOR

(75) Inventor: Hiroshi Yagi, Yuri-gun (JP)

(73) Assignee: TDK Corporation, Tokyo (JP)

( * ) Notice: Subject to any disclaimer, the term of this patent is extended or adjusted under 35 U.S.C. 154(b) by 272 days.

(21) Appl. No.: 11/015,666

(22) Filed: Dec. 20, 2004

(65) Prior Publication Data

US 2005/0167243 A1    Aug. 4, 2005

(30) Foreign Application Priority Data

Jan. 29, 2004   (JP)   ............... 2004-021253

(51) Int. Cl.
*B65G 47/24* (2006.01)
*H01G 4/12* (2006.01)
(52) U.S. Cl. .................................. 198/690.1; 198/778
(58) Field of Classification Search ............ 198/690.1, 198/619, 778, 805
See application file for complete search history.

(56) References Cited

U.S. PATENT DOCUMENTS

| | | | | |
|---|---|---|---|---|
| 3,162,874 A | * | 12/1964 | Autio | 470/45 |
| 4,000,807 A | * | 1/1977 | Molique | 198/443 |
| 4,362,455 A | * | 12/1982 | Hirose | 198/757 |
| 4,416,172 A | * | 11/1983 | Medinger | 81/57.37 |
| 5,042,643 A | * | 8/1991 | Akama | 198/753 |
| 5,526,917 A | * | 6/1996 | Homma | 198/444 |
| 5,638,940 A | * | 6/1997 | Aoyama et al. | 198/493 |
| 5,853,078 A | * | 12/1998 | Kneubuhler | 198/391 |
| 6,206,180 B1 | * | 3/2001 | Sekine et al. | 198/757 |
| 6,440,282 B1 | * | 8/2002 | Wada et al. | 204/298.2 |
| 6,782,992 B2 | * | 8/2004 | Mimura et al. | 198/443 |
| 6,945,384 B2 | * | 9/2005 | Sakota et al. | 198/690.1 |
| 7,014,031 B2 | * | 3/2006 | Aoyama et al. | 198/391 |

FOREIGN PATENT DOCUMENTS

| | | |
|---|---|---|
| JP | A 8-91548 | 4/1996 |
| JP | A 10-284355 | 10/1998 |
| JP | 11-286324 | 10/1999 |

\* cited by examiner

*Primary Examiner*—Douglas Hess
(74) *Attorney, Agent, or Firm*—Oliff & Berridge, PLC (57) ABSTRACT

A method and device for aligning orientation of laminated planer electrodes in laminated electronic parts when the parts are conveyed on a transport passage of a parts feeder. A magnetic field generation unit is disposed beside and outside of the parts feeder for applying magnetic field lines extending in horizontal or vertical direction. Orientation of the electrodes is in conformance with the direction of the magnetic field lines.

9 Claims, 6 Drawing Sheets

METHOD FOR ALIGNING LAMINATED ELECTRONIC PARTS IN DESIRED ORIENTATION AND ALIGNMENT DEVICE THEREFOR

BACKGROUND OF THE INVENTION

The present invention relates to a method for aligning orientation of planer internal electrodes in laminated electronic parts in a predetermined direction during transfer of the electronic parts by means of a parts feeder. The present invention also relates to an alignment device therefor.

Japanese Laid-Open patent application Publication No. H8-91548 discloses a parts feeder for aligning electric parts in a row in a predetermined direction. Each of the electric parts includes a body portion and lead wires made from a soft iron and extending from the body portion. The parts feeder provides a transport passage formed with a groove so that the lead wires can extend through the groove in order to align the electronic parts in one row. The parts feeder also includes a magnet disposed beside the groove for aligning and maintaining orientation of each electronic part by positively inserting the lead wires into the groove. Because the electronic part includes a body portion and the lead wires extending from the body portion, the electronic parts provides a clear nature of orientation or directionability.

Recently, a laminated ceramic chip capacitor as a laminated electronic part has become widely available in terms of miniaturization in size and increase in capacity. The laminated electronic capacitor includes a plurality of ferromagnet-based planer internal electrodes each being stacked on one after another.

Japanese Laid-Open Patent Application Publication No. H10-284355 discloses a method for aligning the laminated ceramic chip capacitors in a row by applying a maginetic field line to the laminated ceramic chip capacitor in a direction parallel to the electrode surface. This method requires a transport passage having a circular cross-section for alignment of the electronic parts.

Japanese Laid-Open Patent Application Publication No. H11-292254 discloses a vibration parts feeder including a bowl and a driving section. The bowl has a bottom section on which electronic parts or components are scattered or stacked. The bowl also has a side wall section whose inner peripheral surface is formed with a spiral track. Each electronic part is transferred from the bottom section to a linear vibration feeder along the spiral track. The driving section includes an electromagnet so as to impart distorting vibration on the bowl. Thus, centrifugal force is applied to the electronic parts so that the parts on the spiral track is urged toward the side wall and the parts can be moved toward the linear vibration feeder.

A desired orientation of each electronic part must be further improved in the parts feeder for placing each laminated electronic parts in the emboss tape with a correct orientation or posture from the linear vibration feeder in order to improve assembleability of the parts to a circuit board.

SUMMARY OF THE INVENTION

It is therefore, an object of the present invention to provide a method for aligning laminated electronic parts in a desirable orientation and to provide an alignment device therefor.

More specifically, the object of the present invention is to provide the aligning method and the alignment device adapted for aligning planer internal electrodes made from ferromagnet in a desirable orientation during transportation of the laminated electric parts such as laminated ceramic capacitors, whereby the laminated electronic parts can be placed in an emboss tape with a correct orientation or posture of the planer internal electrodes.

This and other objects of the present invention will be attained by an alignment device for aligning orientation of laminated planer electrodes in laminated electronic parts, the laminated planer electrodes being mainly made from ferromagnetic material, the device including a parts feeder and a magnetic field generation unit. The parts feeder provides a transportation passage on which a plurality of the laminated electronic parts are fed in a single row. The magnetic field generation unit is disposed outside of and beside the parts feeder to apply one of vertical and horizontal magnetic field lines to the laminated electronic parts running on the transportation passage.

In another aspect of the invention there is provided a method for aligning orientation of laminated planer electrodes in a laminated electronic parts, the electrode being mainly made from a ferromagnetic material, the method including conveying step and applying step. In the conveying step, a plurality of the laminated electronic parts is conveyed on a transport passage in a parts feeder. In the applying step, magnetic field is applied to each of the electronic parts running on the transport passage so as to pass magnetic field lines extending in a direction through the laminated electronic parts to allow the laminated planer electrodes to direct in a direction coincident with the direction of the magnetic field lines.

DETAILED DESCRIPTION OF THE PREFERRED EMBODIMENTS

Recently, the laminated ceramic chip capacitor has advanced in terms of the requirements of miniaturization and capacity. To this effect, the numbers of lamination layers has accordingly been increased in order to obtain electrostatic capacity as much as possible. As a result, the relationship between the width (W) and height (T) of the laminated chip capacitor (W/T) is typically about 1.0.

Figure 9A:
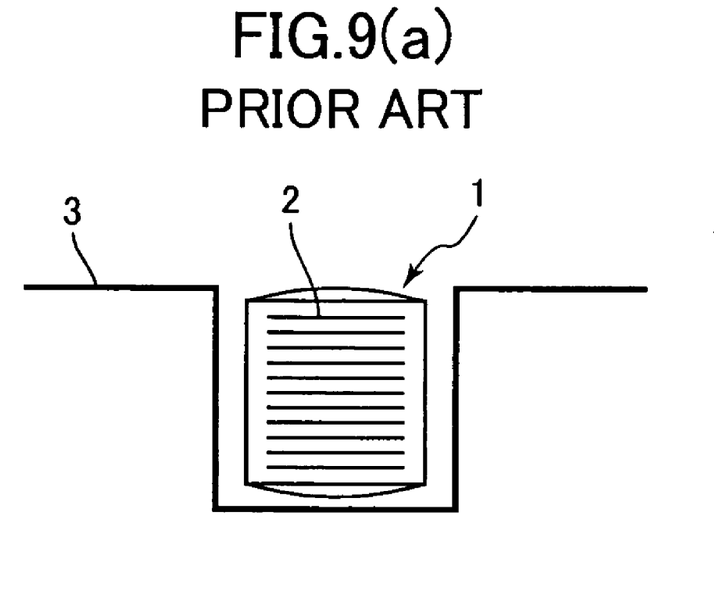
FIG. 9(a) is a schematic view showing a laminated ceramic chip capacitor set in an emboss tape in which planer electrodes are oriented in a horizontal direction.
Figure 9B:
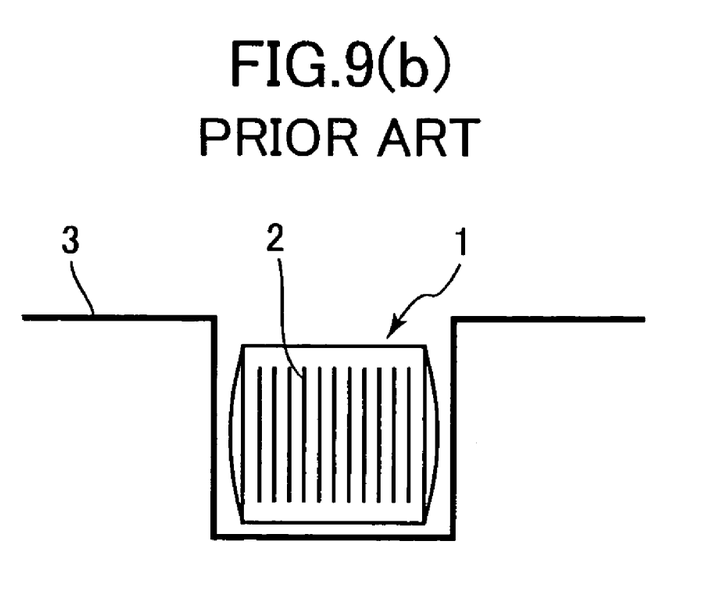
FIG. 9(b) is a schematic view showing the laminated ceramic chip capacitor set in the emboss tape in which planer electrodes are oriented in a vertical direction.

When handling such typical laminated ceramic chip capacitors, it has been impossible to visually select one of the width (W) and height (T) of the laminated ceramic chip capacitor at the time of packaging due to the relation "W/T≈1". Accordingly, the chip capacitors in W and T directions have been randomly placed on an emboss section of an emboss tape which is a packing material. FIG. 9(a) shows a state where the laminated ceramic chip capacitor 1 is put in the emboss tape 3 with the planer internal electrodes 2 oriented in a horizontal direction, and FIG. 9(b) shows a state where the laminated ceramic chip capacitor 1 is put in the emboss tape 3 with the planer internal electrodes 2 oriented in a vertical direction. The placement states shown in FIGS. 9(a) and 9(b) have co-existed.

For manufacturing an electronic circuit on a circuit board, each laminated ceramic chip capacitor placed in the emboss tape is sucked by a suction nozzle of an electronic parts assembling machine, and is mounted on the circuit board. Because the ceramic chips have been packed in the emboss tape in orientations different from each other as shown in FIGS. 9(a) and 9(b), the resultant chips assembled on the circuit board also exhibit different orientation of the internal electrode surfaces. Therefore, stray capacitance significantly varies depending on the circuit pattern on the circuit board and the directions of the internal electrodes in the laminated ceramic chip capacitor. Consequently, a satisfactory circuit design cannot be made. In the embodiments described below, orientation of the internal electrodes can be corrected.

Further, another problem lies in the sucking condition of the laminated ceramic chip capacitors by a suction nozzle. That is, top and bottom surfaces of the laminated ceramic chip capacitor tend to be curved with respect to the lamination direction as shown in FIG. 9(a) with an increase in the number of laminated layers in accordance with the demand of increased capacity of the capacitor. Therefore, transportation of the laminated ceramic chip capacitor cannot be sufficiently performed due to insufficient suction if the suction nozzle is in contact with the curved surface. In the embodiments described below, sufficient suction by a suction nozzle can be performed because of a correct orientation of the laminated electronic parts.

An alignment device for aligning orientation of planer internal electrodes in laminated electronic parts according to a first embodiment of the present invention will be described with reference to FIGS. 1 through 2(b). Here, the laminated electronic parts are typically laminated ceramic chip capacitors 1 shown in FIGS. 9(a) and 9(b), which are the parts or components to be fed. Each of the capacitors 1 includes planer internal electrodes 2 in a laminated manner, and each of the electrodes is made from a ferromagnet mainly containing Ni.

The alignment device 10 includes a parts feeder 20, a linear feeder 30, a hopper 35, and a magnetic field generation unit 40. The details of the parts feeder 20 and the linear vibration feeder 30 are disclosed in Japanese Laid-Open Patent Application Publication No. H11-292254 which is incorporated by reference. Specifically, the parts feeder 20 includes a bowl 21 made from a non-magnetic material, for example, an aluminum subjected to alumite treatment at its surface. The bowl 21 has an open end having a diameter of approximately 180 mm. The bowl 21 has a center section serving as a dish section or a bottom section 22 on which the laminated ceramic chip capacitors 1 is mounted in an uncoordinated fashion.

The bowl 21 has a side wall 24 whose inner peripheral surface is formed with a spiral transport passage 23. The spiral transport passage 23 includes a track section 23b extending from the bottom section 22 as a start point to a position almost 360 degrees from the start point, and an alignment passage 23a continuous from the track section 23b and disposed radially outwardly of the track section 23b.

The parts feeder 20 also includes a driving section (not shown) provided with an electromagnet so as to impart distorting vibration on the bowl 21. Thus, centrifugal force is applied to the laminated ceramic chip capacitors 1 so that the capacitors 1 on the bottom section 22 can enter the track section 23b and goes up along the track section 23b and the alignment passage 23a in a spiral manner by the distorting vibration, in which each capacitor 1 is urged radially outwardly to contact the inner peripheral surface of the side wall 24.

The linear vibration feeder 30 has one end connected to an exit end of the alignment passage 23a for linearly feeding the laminated ceramic chip capacitors 1 arrayed in a line. An embossed tape (not shown) is positioned at another end of the linear vibration feeder 30. The hopper 35 is disposed above the bottom section 22 for supplying the laminated ceramic chip capacitors 1 when the number of the capacitors 1 on the bottom section 22 is decreased.

The magnetic field generation unit 40 is constituted by a permanent magnet or an electromagnet. The magnet 40 is supported to the bowl 21 and is positioned outside of and beside the alignment passage 23a. More specifically, as shown in FIG. 2(a), the magnet 40 is disposed apart from the outer peripheral surface of the bowl 21 by a predetermined distance, and applies magnetic field to the laminated ceramic chip capacitors 1 moving through the alignment passage 23a of the transport passage 23.

Figure 2A:
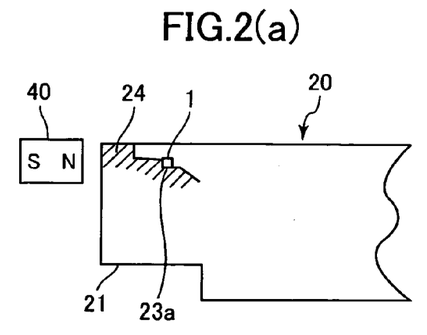
FIG. 2(a) is a schematic cross-sectional view taken along the line IIa-IIa in FIG. 1.
Figure 2B:
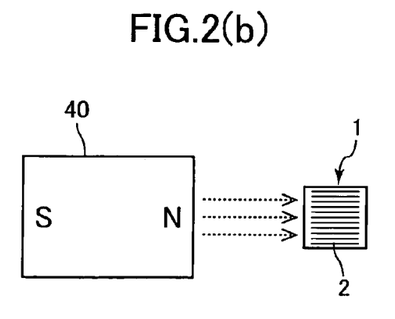
FIG. 2(b) is a schematic illustration for description of magnetic field applied to a laminated ceramic chip capacitor in the first embodiment.

As schematically shown in FIG. 2(b), a line of magnetic force from a magnetic pole of the magnetic field generation unit 40 is applied to the laminated ceramic chip capacitors 1 in the horizontal direction as denoted by dotted lines. As a result, a posture of the capacitor 1 is stabilized such that each planer internal electrode 2 inside the capacitor 1 are oriented in the horizontal direction. Therefore, if the internal electrode surfaces of each laminated ceramic chip capacitor 1 moving through the alignment passage 23a have already been oriented in the horizontal direction, each laminated ceramic chip capacitors 1 merely passes through the alignment passage 23a without changing its posture or orientation. On the other hand, if the internal electrode surfaces have been directed in the vertical direction, the posture of the capacitor 1 is changed by the magnetic field so that the internal electrode surfaces become horizontal state. As a result, a single array of the laminated ceramic chip capacitors 1 can be successively supplied from the alignment passage to the linear feeder 30 with a correct orientation or posture.

Figure 1:
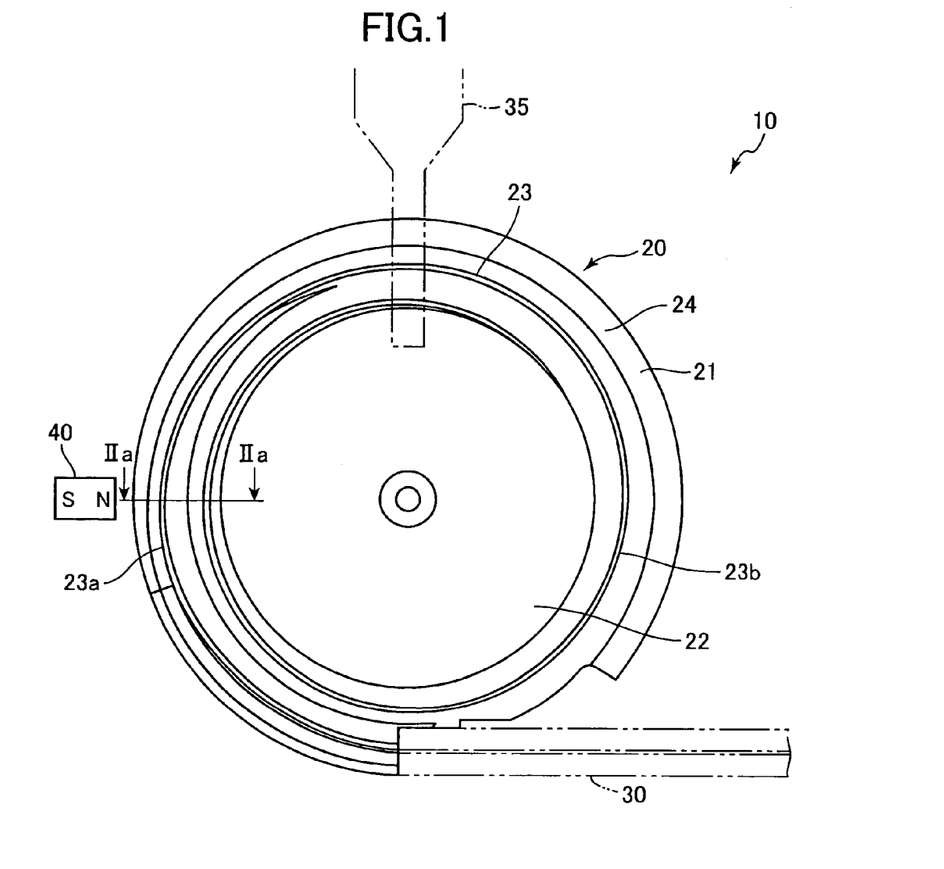
FIG. 1 is a schematic plan view showing an alignment device according to a first embodiment of the present invention.
Figure 3:
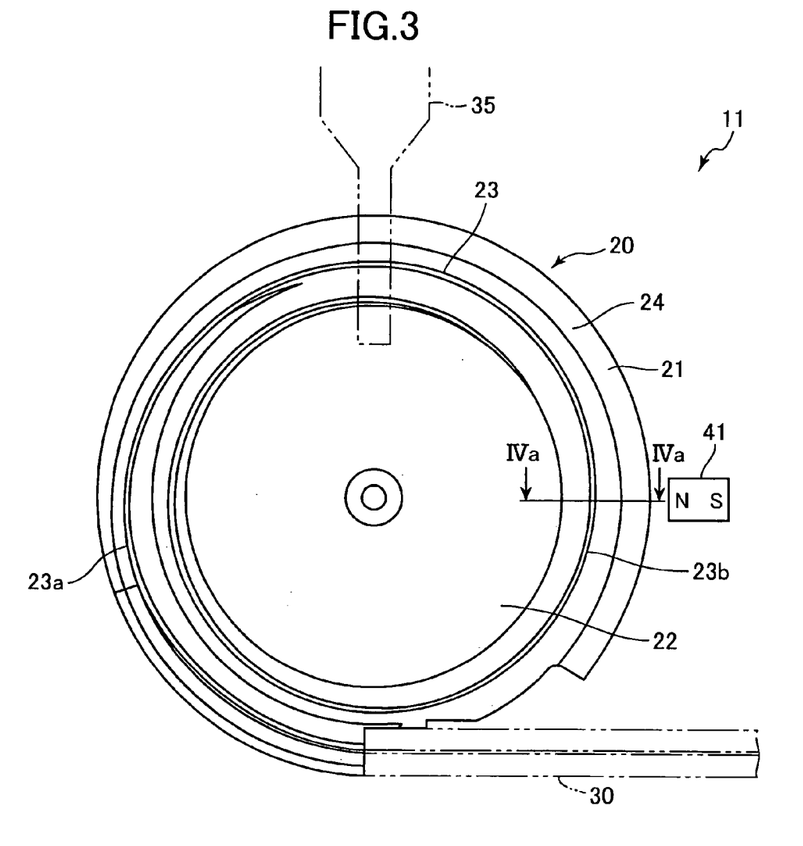
FIG. 3 is a schematic plan view showing an alignment device according to a second embodiment of the present invention.
Figure 4A:
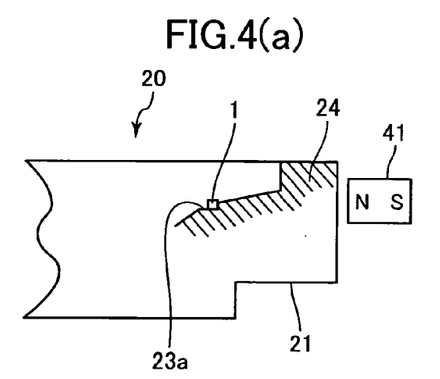
FIG. 4(a) is a schematic cross-sectional view taken along the line IVa-IVa in FIG. 3.
Figure 4B:
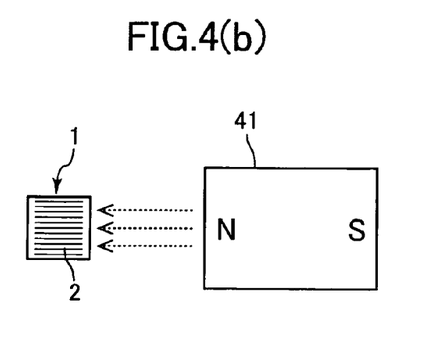
FIG. 4(b) is a schematic illustration for description of magnetic field applied to a laminated ceramic chip capacitor in the second embodiment.

FIGS. 3 through 4(b) show an alignment device 11 for aligning orientation of planer internal electrodes 2 in laminated electronic parts 1 according to a second embodiment of the present invention wherein like parts and components are designated by the same reference numerals and characters as those shown in FIGS. 1 through 2(b).

A magnetic field generation unit 41 constituted by a permanent magnet or an electromagnet is supported to the bowl 21 and is positioned outside of and beside the track section 23b. More specifically, as shown in FIG. 4(a), the magnet 41 is disposed apart from the outer peripheral surface of the bowl 21 by a predetermined distance, and applies magnetic field to the laminated ceramic chip capacitors 1 moving through the track section passage 23b of the transport passage 23. In other words, the magnet 41 is disposed at diametrically opposite side of the magnet 40 of the first embodiment. Operation in the second embodiment is the same as that of the first embodiment except that the magnetic field is not applied to the capacitors 1 in the alignment passage 23a but to the capacitors 1 in the track section 23b. Therefore, further description will be omitted to avoid duplicating description.

Figure 5:
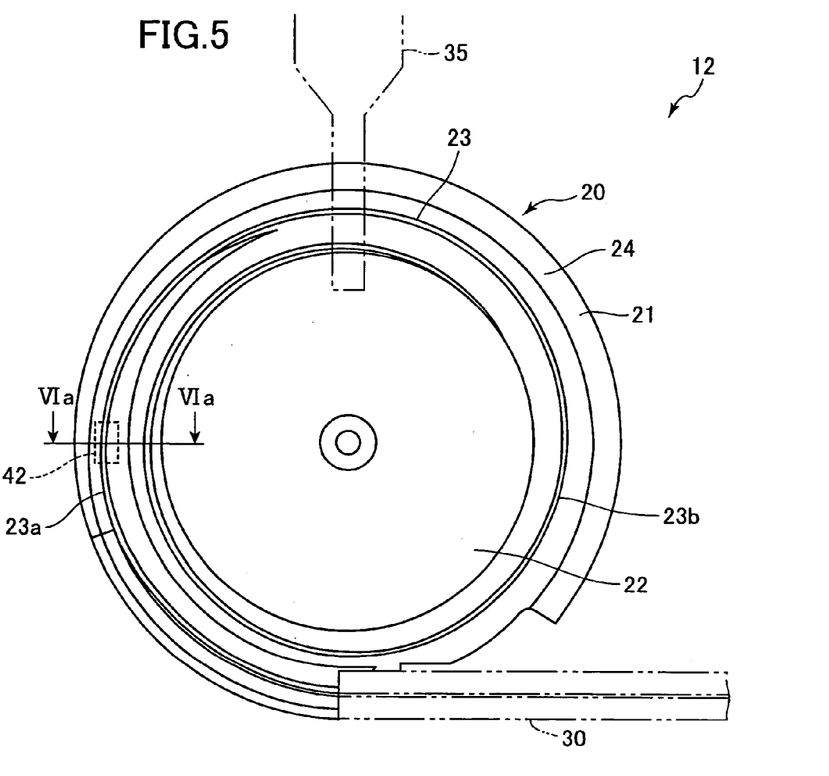
FIG. 5 is a schematic plan view showing an alignment device according to a third embodiment of the present invention.
Figure 6A:
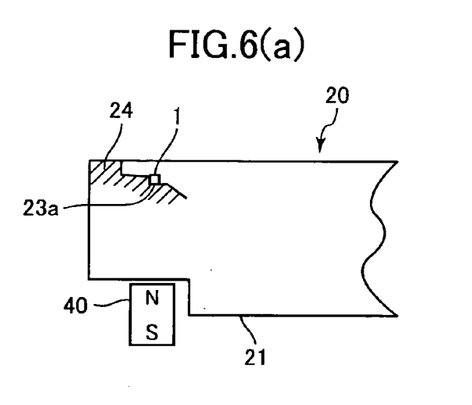
FIG. 6(a) is a schematic cross-sectional view taken along the line VIa-VIa in FIG. 5.
Figure 6B:
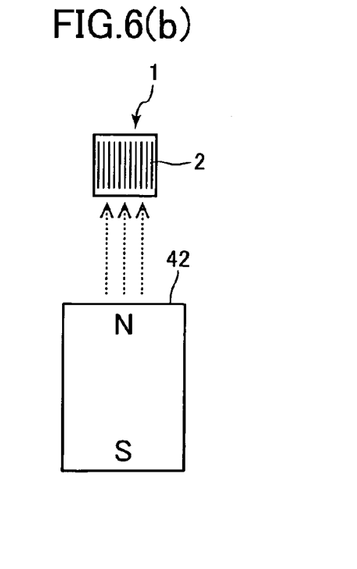
FIG. 6(b) is a schematic illustration for description of magnetic field applied to a laminated ceramic chip capacitor in the third embodiment.

FIGS. 5 through 6(b) show an alignment device 12 for aligning orientation of planer internal electrodes 2 in laminated electronic parts 1 according to a third embodiment of the present invention wherein like parts and components are designated by the same reference numerals and characters as those shown in the foregoing embodiments.

A magnetic field generation unit 42 constituted by a permanent magnet or an electromagnet is supported to the bowl 21 and is positioned below the bowl 21 at a position immediately below the alignment passage 23a. More specifically, as shown in FIG. 6(a), the magnet 42 is disposed apart from the bottom surface of the bowl 21 by a predetermined distance, and applies magnetic field to the laminated ceramic chip capacitors 1 moving through the alignment passage 23a of the transport passage 23.

As schematically shown in FIG. 6(b), a line of magnetic force from a magnetic pole of the magnetic field generation unit 42 is applied to the laminated ceramic chip capacitors 1 in a vertical direction as denoted by dotted lines. As a result, a posture of the capacitor 1 is stabilized such that each planer internal electrode 2 inside the capacitor 1 are oriented in the vertical direction. Therefore, if the internal electrode surfaces of each laminated ceramic chip capacitor 1 moving through the alignment passage 23a have already been oriented in the vertical direction, each laminated ceramic chip capacitors 1 merely passes through the alignment passage 23a without changing its posture or orientation. On the other hand, if the internal electrode surfaces have been directed in the horizontal direction, the posture of the capacitor 1 is changed by the magnetic field so that the internal electrode surfaces become vertical state. As a result, a single array of the laminated ceramic chip capacitors 1 can be successively supplied from the alignment passage 23a to the linear feeder 30 with a unified orientation or posture.

Figure 7:
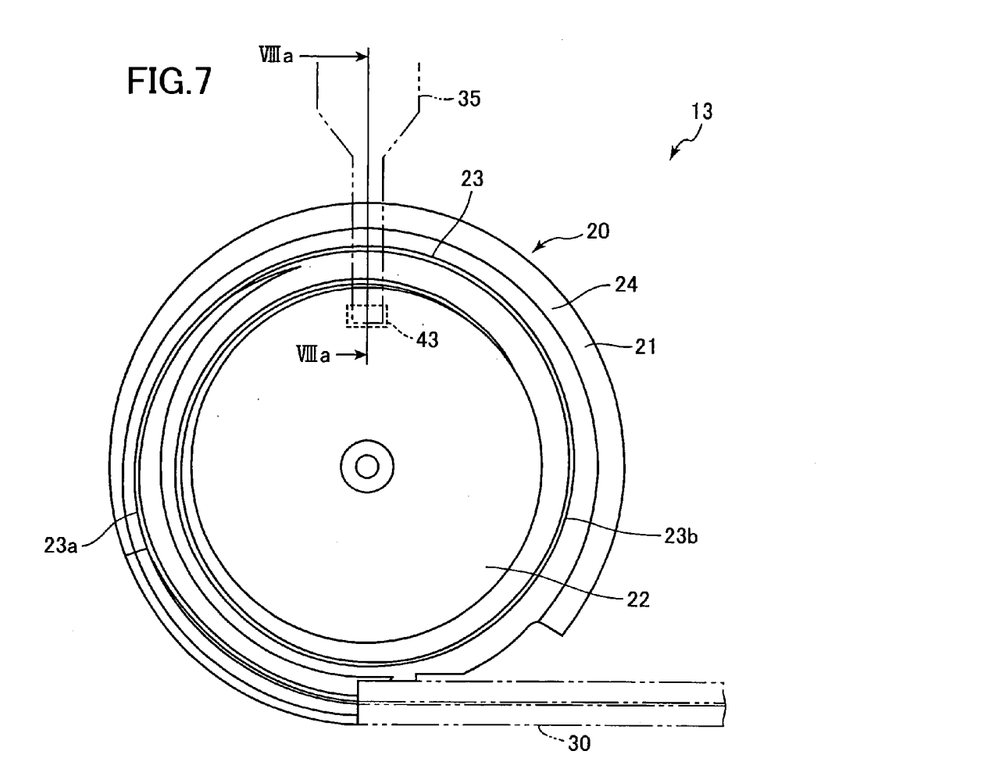
FIG. 7 is a schematic plan view showing an alignment device according to a fourth embodiment of the present invention.
Figure 8A:
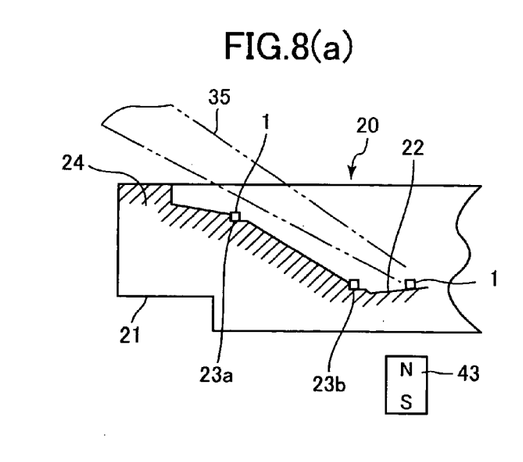
FIG. 8(a) is a schematic cross-sectional view taken along the line VIIIa-VIIIa in FIG. 7.
Figure 8B:
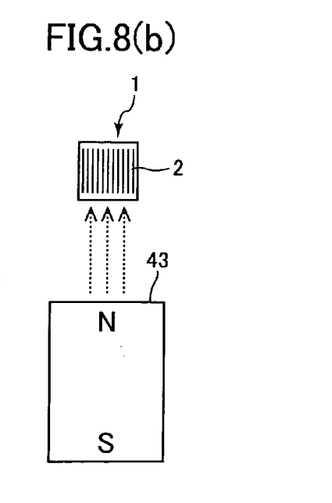
FIG. 8(b) is a schematic illustration for description of magnetic field applied to a laminated ceramic chip capacitor in the fourth embodiment.

FIGS. 7 through 8(b) show an alignment device 13 for aligning orientation of planer internal electrodes 2 in laminated electronic parts 1 according to a fourth embodiment of the present invention wherein like parts and components are designated by the same reference numerals and characters as those shown in the foregoing embodiments.

A magnetic field generation unit 43 constituted by a permanent magnet or an electromagnet is supported to the bowl 21 and is positioned below the bowl 21 at a position immediately below the bottom section 22. More specifically, as shown in FIG. 8(a), the magnet 43 is disposed apart from the bottom surface of the bowl 21 by a predetermined distance, and applies magnetic field to the laminated ceramic chip capacitors 1 moving on the bottom section 22 which also serves as a transportation passage. Operation in the fourth embodiment is the same as that of the third embodiment except that the magnetic field is not applied to the capacitors 1 running on the alignment passage 23a but to the capacitors 1 on the bottom section 22. Therefore, further description will be omitted to avoid duplicating description.

Next, in order to demonstrate the superiority of the above-described embodiments, comparative experiments have been conducted.

Experiment 1

Prepared were laminated ceramic chip capacitors each having a length of 3.2 mm, width of 1.6 mm, and height of 1.6 mm. Each capacitor contained 350 planer internal electrodes in the form of lamination. Prepared was a high frequency parts feeder (HSE-14), a product of Shinko Electric Co., Ltd. The part feeder was in accordance with Japanese laid open Patent Application Publication No. H11-292254, and had a bowl having an outer diameter of 200 mm. As a conventional testing device, the high frequency parts feeder was connected to the linear feeder. As a testing device in accordance with the first and second embodiments, a permanent magnet serving as the magnetic field generating unit was added to the parts feeder with a suitable distance therefrom. That is, magnetic field was applied to each capacitor running on the alignment passage 23a or the track section 23b. As a comparative testing device, a permanent magnet serving as the magnetic field generating unit was added to the parts feeder with a distance outside of the suitable distance.

100 laminated ceramic chip capacitors were randomly placed on the bottom section of a bowl, and the numbers of the capacitors with their correct orientation was counted. This alignment tests were performed 5 times, and an average correct alignment rate was computed. The test results are shown in Table 1 in which setting position of the magnet is shown. Further, in Table 1, "CON", "COM", "EM" represent conventional device, comparative device, and the device according to the present embodiments, respectively, "Distance" implies a distance between the outer peripheral surface of the bowl and the magnet in the radial direction of the bowl, "SA" implies a radially outer side of the alignment passage, and "ST" implies a radially outer side of the track section.

TABLE 1

| Testing device | magnet position | distance (mm) | Testing times | | | | | average alignment rate |
|---|---|---|---|---|---|---|---|---|
| | | | 1 | 2 | 3 | 4 | 5 | |
| 1(CON) | no magnet | — | 65 | 71 | 63 | 69 | 74 | 68.4 |
| 2(COM) | SA | 10 | | | | | | 0 |
| 3(EM) | SA | 15 | 99 | 100 | 99 | 99 | 98 | 99.0 |
| 4(EM) | SA | 20 | 97 | 97 | 97 | 98 | 98 | 97.4 |
| 5(COM) | SA | 25 | 91 | 92 | 92 | 93 | 90 | 91.6 |
| 6(COM) | SA | 30 | 82 | 83 | 81 | 80 | 78 | 80.8 |
| 7(COM) | ST | 10 | | | | | | 0 |

TABLE 1-continued

| Testing device | magnet position | distance (mm) | Testing times 1 | 2 | 3 | 4 | 5 | average alignment rate |
|---|---|---|---|---|---|---|---|---|
| 8(EM) | ST | 15 | 99 | 100 | 99 | 99 | 98 | 99.0 |
| 9(EM) | ST | 20 | 97 | 96 | 98 | 95 | 95 | 96.2 |
| 10(COM) | ST | 25 | 83 | 85 | 79 | 78 | 78 | 80.6 |
| 11(COM) | ST | 30 | 71 | 79 | 71 | 70 | 73 | 72.8 |
| 12(COM) | SA | 10 |  |  |  |  |  | 0 |
| 13(EM) | SA | 15 | 98 | 96 | 99 | 95 | 98 | 97.2 |
| 14(EM) | SA | 20 | 97 | 97 | 96 | 97 | 98 | 97.0 |
| 15(COM) | SA | 25 | 84 | 84 | 86 | 85 | 85 | 84.8 |
| 16(COM) | SA | 30 | 85 | 78 | 89 | 78 | 86 | 83.2 |

As is apparent from Table 1, testing device Nos. 3, 4, 8, 9, 13 and 14 exhibited alignment ratio of 95% or more, which is satisfactory for the horizontal orientation of the electrodes. Further, a desirable distance between the magnet and the outer peripheral surface of the parts feeder is in a range of from 15 to 20 mm at which the magnetic intensity (magnetic flux density) in the horizontal direction at the alignment passage or track section fell in a range from 400 to 2000 G (gauss).

On the other hand, in the conventional device without the magnet (testing device 1), the alignment rate was 68.4% which is not satisfactory. Incidentally, in the testing device 2, 7 and 12, the capacitors did not run because of excessive magnetic adsorption due to excessively close arrangement of the magnet to the feeder.

Experiment 2

Prepared were laminated ceramic chip capacitors the same as that used in the Experiment 1. Prepared was a high frequency parts feeder (HSE-14), a product of Shinko Electric Co., Ltd. The part feeder was in accordance with Japanese laid open Patent Application Publication No. H11-292254, and had a bowl having an outer diameter of 200 mm. As a testing device in accordance with the third and fourth embodiments, a permanent magnet serving as the magnetic field generating unit was added to the parts feeder with a suitable distance therefrom. That is, magnetic field was applied to each capacitor running on the alignment passage 23a or the bottom section 22. As a comparative testing device, a permanent magnet serving as the magnetic field generating unit was added to the parts feeder with a distance outside of the suitable distance.

100 laminated ceramic chip capacitors were randomly placed on the bottom section of bowl, and the numbers of the capacitors with their correct orientation was counted. This alignment tests were performed 5 times, and an average correct alignment rate was computed. The test results are shown in Table 2 in which setting position of the magnet is shown. Further, in Table 2, "COM", and "EM" represent a comparative device, and the device according to the third and fouth embodiments, respectively, "Distance" implies a distance between the bottom of the parts feeder and the magnet in an axial direction of the bowl, "BH" implies that the magnet was positioned below the hopper 35, and "BA" implies that the magnet was positioned below the alignment passage 23a. Testing device Nos. 18 through 20 were in accordance with the third embodiment, and testing device No. 22 was the combination of the third and fourth embodiments in which two magnets were concurrently set at locations different from each other.

TABLE 2

| Testing device | magnet position | distance (mm) | Testing times 1 | 2 | 3 | 4 | 5 | average alignment rate |
|---|---|---|---|---|---|---|---|---|
| 17(COM) | BA | 5 | 85 | 81 | 85 | 85 | 88 | 84.8 |
| 18(EM) | BA | 10 | 98 | 96 | 95 | 98 | 95 | 96.4 |
| 19(EM) | BA | 12.5 | 99 | 98 | 100 | 97 | 98 | 98.4 |
| 20(EM) | BA | 15 | 99 | 98 | 100 | 98 | 100 | 99.0 |
| 21(COM) | BA | 20 | 78 | 74 | 78 | 79 | 73 | 76.4 |
| 22(EM) | BH | 7.5 | 100 | 100 | 99 | 100 | 100 | 99.8 |
|  | BA | 15 |  |  |  |  |  |  |

As is apparent from Table 2, testing device Nos. 18 through 20 exhibited alignment ratio of 95% or more, which is satisfactory for the vertical orientation of the electrodes. Further, a desirable distance between the magnet and the bottom surface of the parts feeder was in a range of from 10 to 15 mm at which the magnetic intensity (magnetic flux density) in the vertical direction at the alignment passage or bottom section fell in a range from 400 to 2000 G (gauss). Furthermore, superior alignment can be obtained by providing two magnets as in the testing device 22 where the first magnet positioned below the hopper 35 was spaced away from the bottom section by 7.5 mm and the second magnet positioned below the alignment passage 23a was spaced away from the bottom section by 15 mm.

While the invention has been described in detail and with reference to the specific embodiments thereof, it would be apparent to those skilled in the art that various changes and modifications may be made therein without departing from the scope of the invention.

Figure 10:
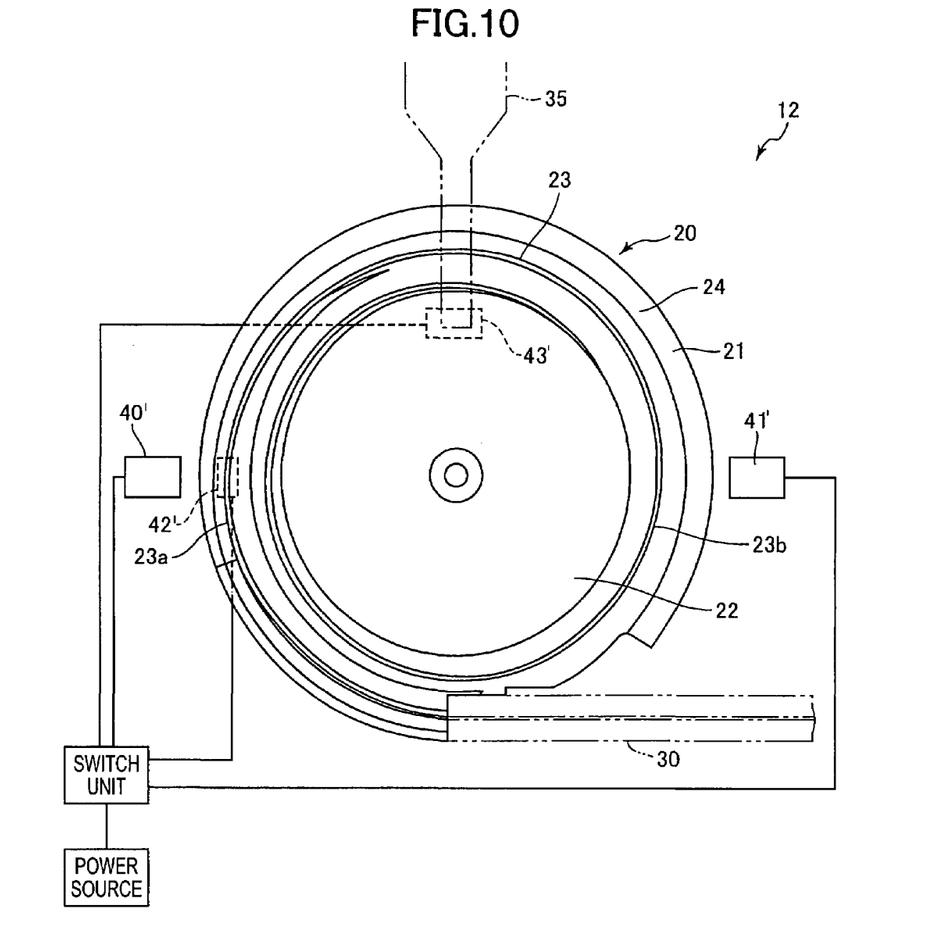
FIG. 10 is a schematic plan view showing an alignment device according to a fifth embodiment of the present invention.

For example, a magnetic field generation unit can be modified by including both the magnet 40 and 41 of the first and second embodiments. Alternatively, the magnet 42 and 43 are co-used as a magnetic field generation unit. Moreover, as shown is FIG. 10, four electromagnets 40', 41', 42' and 43' are used as a magnetic field generation unit at a position corresponding to the magnets 40 through 43, and electricity is selectively applied to one of the one set 40' and 41' and the other set 42' and 43' of these electromagnets. As a result, orientation of the internal electrode surfaces of the laminated ceramic chip capacitor can be easily switched between the vertical orientation and the horizontal orientation.

Further, while the laminated ceramic chip capacitor has been taken as an example of the electronic parts to be fed through the parts feeder 20 in the above embodiments, the present embodiments can be applied to other laminated electronic parts, for example, a compound component or the like having the laminated ceramic chip capacitor as a main component including laminated ferromagnet-based planer internal electrodes.

What is claimed is:

1. An alignment device for aligning orientation of laminated planar electrodes in laminated electronic parts, the laminated planar electrodes being mainly made from ferromagnetic material, the device comprising:
   a parts feeder providing a transportation passage on which a plurality of the laminated electronic parts are fed in a single row, the parts feeder comprising a bowl including a bottom section and a side wall section having an outer peripheral surface and an inner peripheral surface in which a spiral passage is formed, the bottom section and the spiral passage serving as the transportation passage;

a magnetic field generation unit disposed outside of and beside the parts feeder to apply one of vertical and horizontal magnetic field lines to the laminated electronic parts running on the transportation passage, the magnetic field generation unit comprising a first electromagnet disposed radially outwardly of the spiral passage, and a second electromagnet disposed below the bowl; and means for selectively applying electricity to one of the first electromagnet and the second electromagnet.

2. The alignment device as claimed in claim 1, wherein the ferromagnetic material contains Ni.

3. The alignment device as claimed in claim 1, wherein the first electromagnet is spaced away from the outer peripheral surface by a distance so as to apply from 400 to 2000 Gauss of magnetic flux density to the laminated electronic parts running on the spiral passage.

4. The alignment device as claimed in claim 1, wherein the second electromagnet is spaced away from the bowl in an axial direction thereof and immediately below the spiral passage by a distance so as to apply from 400 to 2000 Gauss of magnetic flux density to the laminated electronic parts running on the spiral passage.

5. The alignment device as claimed in claim 1, wherein the second electromagnet is disposed below the bottom section and spaced away therefrom by a distance so as to apply from 400 to 2000 Gauss of magnetic flux density to the laminated electronic parts running on the bottom section.

6. The alignment device as claimed in claim 5, further comprising a hopper disposed above the bottom section for supplying the laminated electronic parts thereon, the second electromagnet being disposed vertically below the hopper.

7. A method for aligning orientation of laminated planar electrodes in laminated electronic parts, the electrodes being mainly made from a ferromagnetic material, the method using an alignment device including:

a parts feeder providing a transportation passage on which a plurality of the laminated electronic parts are fed in a single row, the parts feeder comprising a bowl including a bottom section and a side wall section having an outer peripheral surface and an inner peripheral surface in which a spiral passage is formed, the bottom section and the spiral passage serving as the transportation passage; and a magnetic field generation unit disposed outside of and beside the parts feeder to apply one of vertical and horizontal magnetic field lines to the laminated electronic parts running on the transportation passage, the magnetic field generation unit comprising a first electromagnet disposed radially outwardly of the spiral passage, and a second electromagnet disposed below the bowl;

the method comprising the steps of:

conveying a plurality of the laminated electronic parts on the transport passage in the parts feeder;

selecting one of the first electromagnet and the second electromagnet and applying electricity to the selected one of the first and second electromagnets; and applying magnetic field to each of the electronic parts running on the transport passage so as to pass magnetic field lines extending, through the laminated electronic parts, in one of a horizontal direction and a vertical direction depending on the selection of one of the first electromagnet and second electromagnet to allow the laminated planar electrodes to direct in a direction coincident with the direction of the magnetic field lines.

8. An alignment device for aligning orientation of laminated planar electrodes in laminated electronic parts, the laminated planar electrodes being mainly made from ferromagnetic material, the device comprising:

a parts feeder providing a transportation passage on which a plurality of the laminated electronic parts are fed in a single row, the parts feeder comprising a bowl including a bottom section and a side wall section having an outer peripheral surface and an inner peripheral surface in which a spiral passage is formed, the bottom section and the spiral passage serving as the transportation passage;

a magnetic field generation unit disposed outside of and beside the parts feeder and below the bowl to apply vertical magnetic field lines to the laminated electronic parts running on the transportation passage, the magnetic field generation unit being disposed below the bottom section and spaced away therefrom by a distance so as to apply from 400 to 2000 Gauss of magnetic flux density to the laminated electronic parts running on the bottom section; and a hopper disposed above the bottom section for supplying the laminated electronic parts thereon, the magnetic field generation unit being disposed vertically below the hopper.

9. A method for aligning orientation of laminated planar electrodes in a laminated electronic parts, the electrodes being mainly made from a ferromagnetic material; the method using an alignment device including:

a parts feeder providing a transportation passage on which a plurality of the laminated electronic parts are fed in a single row, the parts feeder comprising a bowl including a bottom section and a side wall section having an outer peripheral surface and an inner peripheral surface in which a spiral passage is formed, the bottom section and the spiral passage serving as the transportation passage;

a magnetic field generation unit disposed outside of and beside the parts feeder and below the bowl to apply vertical magnetic field lines to the laminated electronic parts running on the transportation passage, the magnetic field generation unit being disposed below the bottom section and spaced away therefrom by a distance so as to apply from 400 to 2000 Gauss of magnetic flux density to the laminated electronic parts running on the bottom section; and a hopper disposed above the bottom section for supplying the laminated electronic parts thereon, the magnetic field generation unit being disposed vertically below the hopper, the method comprising the steps of:

conveying a plurality of the laminated electronic parts on the transport passage in the parts feeder; and applying magnetic field to each of the electronic parts running on the transport passage so as to pass magnetic field lines extending in a direction through the laminated electronic parts to allow the laminated planar electrodes to direct in a direction coincident with the direction of the magnetic field lines.

* * * * *